United States Patent [19]

Hamid et al.

[11] 4,072,941
[45] Feb. 7, 1978

[54] UNDERWATER MONITORING

[75] Inventors: Michael A. Hamid, Winnipeg; Oscar A. Sandoz, Ottawa, both of Canada

[73] Assignee: The Minister of National Defense of Her Majesty's Canadian Government, Ottawa, Canada

[21] Appl. No.: 705,493

[22] Filed: July 15, 1976

[30] Foreign Application Priority Data

July 17, 1975 Canada ............................. 231687

[51] Int. Cl.² ............................................. G01S 9/02
[52] U.S. Cl. .............................. 343/5 NA; 343/5 PD; 343/15
[58] Field of Search .................. 343/5 NA, 5 PD, 15, 343/16 R

[56] References Cited

U.S. PATENT DOCUMENTS 3,237,191  2/1966  Bojko ................................. 343/5 PD
3,805,263  4/1974  Ueda ................................. 343/5 PD
3,903,520  9/1975  Shostak ......................... 343/5 NA X Primary Examiner—T.H. Tubbesing
Attorney, Agent, or Firm—Sughrue, Rothwell, Mion, Zinn and Macpeak

[57] ABSTRACT

Apparatus for detecting the presence of an underwater object measures variations in the input impedance of a monopole antenna to provide data on the object. A sweep generator supplies a first electrical signal of varying frequency for transmission as an electromagnetic signal propagated through water from the antenna, and means are provided for detecting reflections of the electromagnetic signal to provide a second electrical signal, which is compared with the first electrical signal to provide an output signal. Preferably, the monopole antenna is one of three such antennas, which are provided with means for comparing input impedances of the antennas to provide an output signal representing the bearing of the object.

9 Claims, 4 Drawing Figures

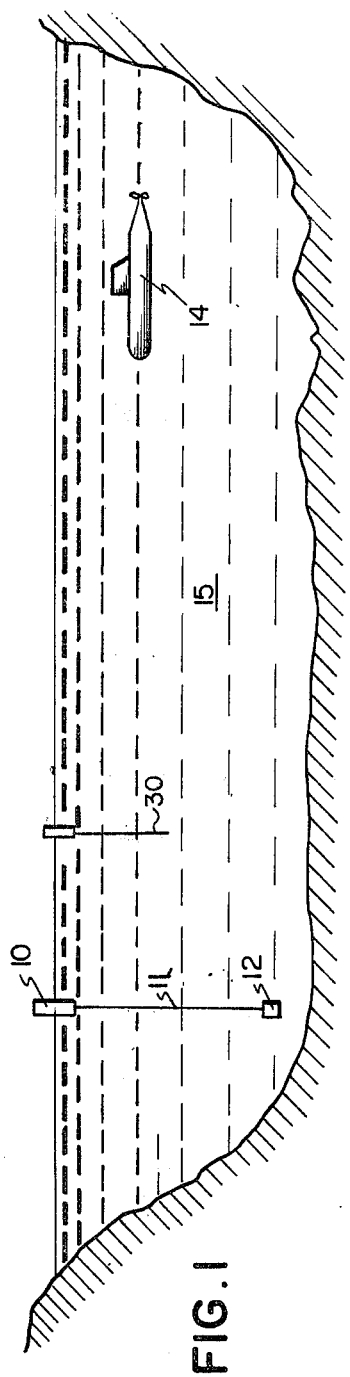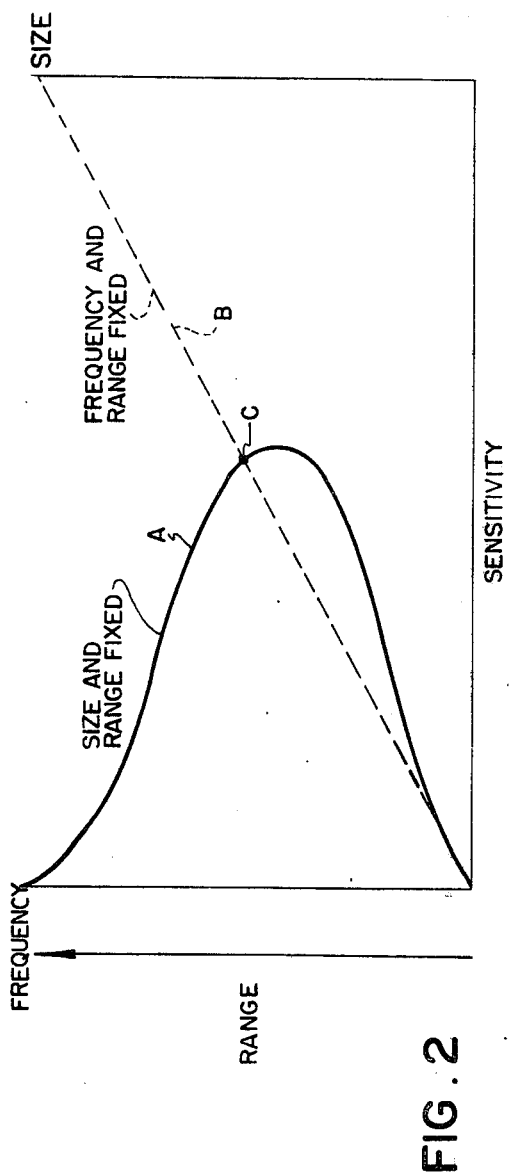

UNDERWATER MONITORING

BACKGROUND OF THE INVENTION

1. Field of the Invention

The present invention relates to apparatus for detecting the presence of an underwater object, for example, a submarine, a school of fish, swimmers, an iceberg, an ice layer, polluting materials, vegetation or a thermal current, and may be used to detect an underwater intruding object, for example, a "friendly" vessel or an intruding enemy vessel or target.

2. Description of the Prior Art

The various acoustic, ultrasonic, optical and radio frequency techniques which have previously been proposed or implemented for this purpose have the disadvantage that they are costly, complicated to manufacture, install and operate, or undesirably limited in range and accuracy.

OBJECT OF THE INVENTION

It is an object of the present invention to provide a novel and improved apparatus for detecting the presence of an underwater object which at least partially mitigates the above-mentioned disadvantages.

SUMMARY OF THE INVENTION

Accordingly to the present invention, there is provided apparatus for detecting the presence of an underwater object, comprising means for generating a first electrical signal of varying frequency, a monopole antenna, means for applying said first electrical signal to said monopole antenna for transmission of said signal by said monopole antenna as an electromagnetic signal propagated through a body of water to said object, means for detecting reflections of said electromagnetic signal received by said monopole antenna and for providing a second electrical signal corresponding to said reflections, means for comparing said first and second electrical signals to provide an output signal corresponding to variation in the input impedance of said monopole antenna, and means for indicating said output signal.

More particularly, the present invention is based on an appreciation of the fact that variation in the input impedance of a monopole antenna over a grounded plane is a function not only of the dimensions of the monopole and the electrical parameters of the surrounding body of water, such as the height of surface waves, but also of the geometrical and electrical parameters of the object when the latter is within the range of the monopole antenna.

Furthermore, the input impedance of the monopole antenna will vary as a function of the frequency of the electromagnetic signal transmitted by the antenna, and of the size and range of the object.

As the frequency of the transmitted signal increases, the size of the object relative to the wavelength of a transmitted electromagnetic wavelength increases, but the range of propagation of the electromagnetic signal in the water will become more limited.

As described in greater detail hereinafter, an optimum frequency can be determined at which maximum sensitivity and resolution are obtained. However, this optimum frequency will depend on the size of the target, which itself is indeterminate. Therefore, the frequency of the transmitted electromagnetic signal is preferably varied to include the optimum detection frequency for various object sizes, and the optimum frequency in any particular case may be determined by selection of the frequency at which the reflection coefficient, is a maximum.

In order not only to detect the presence of the object, but also the bearing of the object with respect to the apparatus, the latter may include an array of three mutually spaced monopole antennas, and means for comparing the input impedances of the three monopole antennas to provide an output signal representing the bearing of the object.

BRIEF DESCRIPTION OF THE DRAWINGS

The invention will be more readily understood from the following description of preferred embodiments thereof given, by way of example, with reference to the accompanying drawings, in which:

FIG. 1 shows a diagrammatic view of apparatus embodying the present invention floating in a body of water containing an intruding vessel;

FIG. 2 shows a diagram illustrating the effect of variation of the frequency of the transmitted electromagnetic signal and of the size of the object being detected plotted against the sensitivity of the detecting apparatus;

DESCRIPTION OF THE PREFERRED EMBODIMENT

Figure 3:
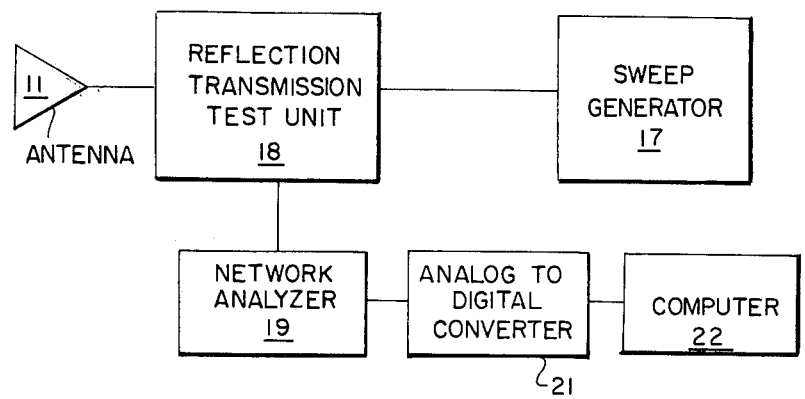
FIG. 3 shows a block diagram illustrating the components of the apparatus of FIG. 1.

The apparatus for detecting an object, illustrated in FIG. 1, comprises a buoy 10, a monopole antenna wire 11 extending downwardly from the buoy 10, and a block 12 suspended by the lower end of the monopoled antenna wire 11 and serving as a weight for maintaining the monopole antenna wire 11 in a vertical position.

In FIG. 1, there is also illustrated an object which is to be detected, the object being illustrated as an intruding submarine vessel 14.

The presence of the intruding submarine vessel 14 is detected by the variation in the input impedance of the monopole antenna wire 11 caused by the presence of the intruding submarine vessel 14.

More particularly, the input impedance of the monopole antenna wire 11 will be affected not only by the presence, but also by the size, conductivity, position and range of the intruding submarine vessel 14, as well as by other factors such as the temperature of the body of water 15 containing the detecting apparatus and the intruding submarine vessel 14, the height of any surface waves on the body of water 15, the presence of ice, the depth of the intruding submarine vessel 14 beneath the surface of the body of water 15, the length of the monopole antenna wire 11 and the height of the body of water 15.

In addition, the input impedance of the monopole antenna wire will vary with the frequency of the electromagnetic signal transmitted by the monopole antenna wire 11. As this frequency increases, the size of the intruding submarine vessel 14 relative to the wavelength of the electromagnetic signal will increase, but the propagation of the electromagnetic signal in the body of water 15 will become more limited in range.

As shown in FIG. 2, the variation in the sensitivity of the detecting apparatus, as the frequency is varied, assuming that the size of the intruding submarine vessel 14 and the range of the intruding submarine vessel 14 from the monopole antenna wire 11 are fixed, is illustrated by curve A. The variation in the sensitivity of the detecting apparatus in comparison to the size of the intruding submarine vessel 14, assuming that the frequency of the transmitted electromagnetic signal and the range of the intruding submarine vessel 14 from the monopole antenna wire 11 are fixed, is indicated by the broken straight line B.

It will be evident from this that the point C at which the curve A and the broken line B intersect represents the maximum sensitivity of the detecting apparatus for a particular size of the intruding submarine vessel 14, and thus indicates the optimum frequency of the transmitted electrical signal for detecting the intruding submarine vessel 14.

However, the detecting apparatus is required to detect objects of various sizes, and consequently the optimum frequency of the electromagnetic signal transmitted by the monopole antenna wire 11 will vary.

Therefore, the frequency of the transmitted electromagnetic signal is varied in order to optimize the sensitivity of the detection for various objects to be detected, the range of variation of the frequency of the transmitted electromagnetic signal being such as to maximize the variation in the input impedance of the monopole antenna wire 11 in response to the anticipated variation in the size and conductivity of the objects to be detected.

The equipment for detecting variations in the input impedance of the monopole antenna wire 11 is housed in the buoy 10, and is illustrated in FIG. 3.

This equipment includes a sweep generator 17 for generating an output signal of varying frequency, e.g. a continuous sinusoidal wave or a pulsed wave with a variable pulse repetition frequency. This output signal is supplied by the sweep generator 17 to a reflection transmission test unit 18, which in turn feeds the antenna 11. The reflected signal detected by the antenna 11, and a reference signal corresponding to the varying frequency output signal of the sweep generator 17, are supplied by the reflection transmission test unit 18 to a network analyzer 19, where the amplitude and phase of these two signals are compared to provide an output signal. This output signal is fed from the network analyzer 19, through an analog to digital converter 21, to a digital computer 22.

The above-mentioned components shown as blocks in FIG. 3 are commercially available products marketed by Hewlett-Packard (Canada) Ltd., under the following model Nos.:

| | |
|---|---|
| Sweep generator 17 | HP Model 8601 A |
| Reflection-Transmission Test Unit 18 | HP Model 11652A |
| Network analyzer 19 | HP Model 8407 |
| Analog to digital converter 21 | HP Model 2070A |
| Computer 22 | HP Model 3042A or 8543A |

The shell of the buoy 10 is used as the ground plane, but the size of the buoy 10 is not determined for this purpose.

Power for operating the sweep geneator 17, the reflection transmission unit 18, the network analyzer 20, the converter 21 and the computer 22 may be supplied to the buoy 10 through an underwater cable, in cases where the apparatus is installed in harbours or sufficiently near to a power source installation. In the case of off-coast detection stations, battery power may be employed, the battery being housed in the buoy 10.

Another possibility is to provide the apparatus with means energized by ocean waves for generating electrical power to be stored in a battery in the buoy 10.

Since the sensitivity of the operation of the above-described apparatus depends on the distortion of the monopole radiation pattern caused by the presence of the intruding underwater vessel 14, and the associated change in the input impedance of the monopole antenna wire 11, it will be appreciated that the operation of the apparatus depends on the amount of power which can be transmitted by the monopole antenna wire 11. In the case of the higher power levels required to achieve high ranges, the reflection-transmission test unit 18 should be protected, and this may conveniently be effected by a suitable polyconductor device.

Figure 4:
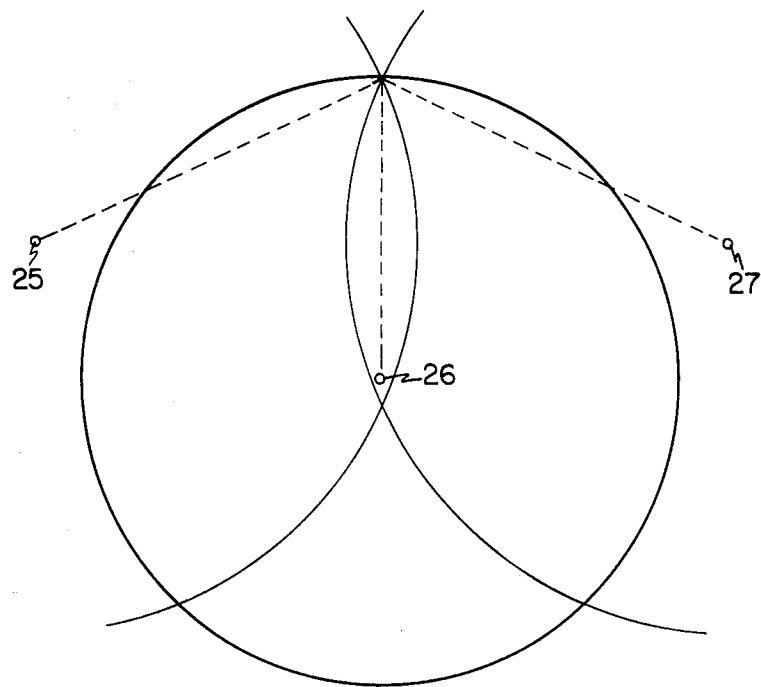
FIG. 4 shows a diagram representing the determination of the bearing of a detected object with respect to three dipole antennas.

Since a single monopole is only capable of detecting the presence of an object on the circumference of a circle whose radius is the range from the monopole antenna to the object, it is desirable to employ a system, such as that illustrated in FIG. 4, comprising an array of three monopole antenna wires 25, 26 and 27 in order not only to detect the range of the intruding object, but also its bearing with respect to the monopole array.

The three monopoles 25, 26 and 27 are identical in size, and are disposed such that the spacing between any two of the monopole antenna wires 25, 26 and 27 is larger than the anticipated largest linear dimension of the object to be detected.

Each of the monopole antenna wires 25, 26 and 27 must be calibrated. This is effected by varying the frequency of the electromagnetic signal transmitted by each of the three monopole antenna wires, and measuring and recording the impedance of the latter for various objects located at various ranges and bearings. The information obtained in this way is stored in a digital computer.

When the system is in operation, the variations in the input impedances of the three monopole antenna wires 25, 26 and 27 is fed to the computer, where it is compared with the calibration details. The resulting data is then analyzed to provide the distance, bearing and approximate size of the detected object.

More particularly, it will be seen from FIG. 4 that each of the three monopoles 25, 26 and 27, when supplied with the same power as the other two of the monopole antenna wires, will have its own circle of range. The radius of each of the circles is obtained from the calibration data obtained from the individual antenna wires, and the intersection of any two of the wires indicates two possible locations for the detected object. The third monopole antenna wire provides the precise bearing of the object. Since each of the monopole antenna wires is operated with a swept frequency, and in effect selects its optimum frequency, depending on the size of the detected object, it is possible to ascertain the size of the object from the individual operating frequency of each of the monopole antenna wires.

When this apparatus is in use, at least one, and preferably each, of the monopole antenna wires is interrogated at predetermined intervals, i.e. is used to transmit an electromagnetic signal through the body of water 15, to ascertain whether any intruding object is present. If such an object is found to be present, then the detection of the object in this way by one of the monopole antenna wires is employed to produce a coded signal, resulting in an alarm. When this alarm is received, each of the three monopole antenna wires is operated, in sequence, for ascertaining the bearing and size of the intruding object.

To enable the system to be checked occasionally, a reference wire 30 is included so that any perturbations in the input impedance due, for example, to pollution in the vicinity of any of the monopole antenna wires may be detected and corrected. The reference wire can also be used to compensate for variation in the water temperature, which is expected to be insignificant, except in seasons and locations where ice and snow accumulations may have a significant effect on the input impedances of the monopole antenna wires.

It is envisaged that the above-described detection system may be provided off-shore and, if not directly linked by cable to an on-shore monitoring station, may be provided with a radio transmission system for transmitting the detection data to a receiver provided on-shore or aboard a ship or aircraft.

It is also envisaged that the system may be adapted for mobile protection against intrusion of enemy vessels in the vicinity of warships, in which case the apparatus may be attached to tow cables. In this connection, it is noted that it is generally very difficult to determine the bearing and range of an enemy vessel beyond the line of sight, or in severe weather conditions, or in certain circumstances where radio silence conditions are operative, and the above-described apparatus is expected to be useful in this connection.

In the case of detection of large objects such as ships, the optimum frequency is in a very low frequency range. Consequently, the construction and orientation of the ships are of less importance, since the apparatus will in effect be sensitive to the total volume and surface area of the ships.

Moreover, the present system of detection cannot be deceived by most existing counter measures by which a ship under observation can attempt to shield itself or deceive with respect to its range or bearing or both.

We claim:

1. Apparatus for detecting the presence of an underwater object, comprising:
   means for generating a first electrical signal of varying frequency;
   a monopole antenna;
   means for applying said first electrical signal of varying frequency to said monopole antenna for transmission of said signal by said monopole antenna as an electromagnetic signal propagated through a body of water to said object;
   said means for applying also receiving reflections of said electromagnetic signal sensed by said monopole antenna and providing a sound electrical signal corresponding to said reflections;
   means for comparing said first and second electrical signals to provide an output signal corresponding to variation in the input impedance of said monopole antenna; and
   means for indicating said output signal.

2. Apparatus as claimed in claim 1, in which a reference wire is provided for detecting perturbations in the impedance.

3. Apparatus as claimed in claim 1, wherein said means for generating the first electrical signal comprise a sweep generator.

4. Apparatus as claimed in claim 2, wherein said means for generating the first electrical signal comprise a sweep generator.

5. Apparatus as claimed in claim 1, wherein an analog-to-digital converter is provided between said comparing means and said indicating means.

6. Apparatus as claimed in claim 5, wherein means for computing are connected to the output of said analog-to-digital converters.

7. Apparatus as claimed in claim 1, wherein said apparatus is housed in a buoy.

8. Apparatus for detecting the presence of an underwater object, comprising:
   three mutually spaced monopole antennas;
   each of said antennas being provided respectively with a signal generating, detecting and processing apparatus comprising:
   means for generating a first electrical signal of varying frequency;
   means for applying said first electrical signal of varying frequency to said monopole antenna for transmission of said signal by said monopole antenna as an electromagnetic signal propagated through a body of water to said object;
   said means for applying also receiving reflections of said electromagnetic signal sensed by said monopole antenna and providing a second electrical signal corresponding to said reflections;
   means for comparing said first and second electrical signals to provide an output signal corresponding to variation in the input impedance of said monopole antenna; and
   means for indicating said output signal.

9. Apparatus as claimed in claim 8, wherein said comparing means comprise means for comparing the input impedances of said three monopole antennas wherein said output signal of said comparing means is a function of the bearing of said object with respect to said monopole antennas.

* * * * *